(12) United States Patent
Hill et al.

(10) Patent No.: US 7,896,619 B2
(45) Date of Patent: Mar. 1, 2011

(54) BLADES

(75) Inventors: Graham Frederick John Hill, Malvern (GB); Paul Nicholas Methven, Gloucester (GB)

(73) Assignee: GE Aviation Systems Limited, Grand Rapids, MI (US)

( * ) Notice: Subject to any disclaimer, the term of this patent is extended or adjusted under 35 U.S.C. 154(b) by 821 days.

(21) Appl. No.: 11/802,714

(22) Filed: May 24, 2007

(65) Prior Publication Data

US 2008/0075602 A1    Mar. 27, 2008

(30) Foreign Application Priority Data

May 25, 2006   (GB)  ................... 0610372.5

(51) Int. Cl.
*F04D 29/38* (2006.01)
(52) U.S. Cl. .................... 416/230; 416/241 R
(58) Field of Classification Search ............ 416/223 R, 416/224, 230, 241 R
See application file for complete search history.

(56) References Cited

U.S. PATENT DOCUMENTS

| | | | |
|---|---|---|---|
| 4,810,167 A * | 3/1989 | Spoltman et al. | 416/229 A |
| 5,279,892 A | 1/1994 | Baldwin et al. | |
| 5,308,228 A * | 5/1994 | Benoit et al. | 416/230 |
| 5,314,309 A * | 5/1994 | Blakeley et al. | 416/226 |
| 5,375,978 A * | 12/1994 | Evans et al. | 416/230 |
| 5,674,370 A | 10/1997 | DuPree | |
| 5,881,972 A | 3/1999 | Smith et al. | |

FOREIGN PATENT DOCUMENTS

| | | |
|---|---|---|
| EP | 0735161 | 10/1996 |
| GB | 646636 | 11/1950 |
| GB | 1328167 A | 8/1973 |
| GB | 1557569 A | 12/1979 |

OTHER PUBLICATIONS

Official Action issued in connection with corresponding GB Application No. 0709257, Jul. 20, 2010.
Search Report issued in connection with corresponding GB Application No. 0709257, Sep. 4, 2007.

* cited by examiner

*Primary Examiner*—Igor Kershteyn
(74) *Attorney, Agent, or Firm*—Global Patent Operation; Jonathan E. Thomas

(57) ABSTRACT

Compressor fan blades have an isotropic core and composite fiber layers in an epoxy matrix. The fibers on opposite broad surfaces of the blade extend at an angle of between 25° and 35° to the blade length. The fibers on opposites sides of the blade are inclined in opposite senses such that extension force applied to the blade as it rotates produces opposing forces in the composite layers that resist untwisting of the blade. The thickness of the fiber layers varies from the leading edge to the trailing edge, being thicker towards the leading edge.

15 Claims, 2 Drawing Sheets

BLADES

BACKGROUND OF THE INVENTION

This invention relates to blades.

The invention is more particularly concerned with rotating aerofoil blades such as fan blades used in turbomachinery, such as in gas-turbine engines.

Conventional gas-turbine engine blades are made of metal, such as titanium. These blades are capable of withstanding the temperatures to which they are exposed and have a relatively good chance of surviving impact with foreign bodies, such as bird strikes, without seriously affecting engine performance. Metal blades, however, are relatively heavy so increase the overall weight of the engine and reduce its performance. Efforts have been made, therefore, in recent years to develop blades made of alternative, lighter materials such as composite materials, for example, carbon fiber epoxy composites. The problem with such composite blades is that they are not as robust as metal blades and are more easily damaged by contact with foreign objects. Examples of composite blades are described in, EP0735161, GB646636 and U.S. Pat. No. 5,881,972. Attempts have been made to protect the leading edge of the blades, which are most likely to be subject to damage, by means of metal guards. Even with a guard on the leading edge of the blades, conventional composite blades still do not have sufficient strength to survive impact with a large, fast object, such as a bird ingested into an aircraft engine travelling at high speed.

In order to maximize efficiency of turbomachinery, the gap between the tip of the blade and the surrounding components is made as small as possible. However, the gap must be sufficient to accommodate any extension of the blades when the machinery is running at high speed. When highly twisted blades are run at high speed, up to about 3500 rpm, the centrifugal force on the blades tends to make them untwist, thereby causing them to extend in length. This leads to design problems in how to accommodate blade extension without compromising efficiency.

BRIEF SUMMARY OF THE INVENTION

It is an object of the present invention to provide an alternative blade and alternative machinery including such blades.

According to one aspect of the present invention there is provided a blade for turbomachinery having opposed broad surfaces extending along the length of the blade and separated from one another by a leading edge and a trailing edge, the blade having composite fiber layers adjacent respective opposed surfaces, the fibers in the layers on opposed surfaces being inclined with respect to one another such that extension forces applied to the blade along its length produce oppositely-directed shear forces in the two composite layers resisting untwisting of the blade.

According to another aspect of the present invention there is provided a blade for turbomachinery having opposed broad surfaces extending along the length of the blade and separated from one another by a leading edge and a trailing edge, the blade having composite fiber layers adjacent respective opposed surfaces, and the layers on opposed surfaces being arranged such that extension forces applied to the blade along its length produce opposing forces in the composite layers resisting untwisting of the blade.

The angle of the fibers to the blade length is preferably between about 25° and 35° in opposite senses on opposite sides of the blade. The outer tip of the blade is preferably inclined at an angle of substantially 60° relative to the root when at rest. The fibers may be made of a carbon material and the composite fiber layers may include fibers bonded into an epoxy resin. The blade preferably has an isotropic core. The fiber layers preferably vary in thickness from the leading edge to the trailing edge, the layers being thicker towards the leading edge than the trailing edge. The blade preferably includes an outer surface layer of an impact-resistant material.

According to a further aspect of the present invention there is provided turbomachinery including a plurality of blades according to the above one or other aspect of the present invention.

According to fourth aspect of the present invention there is provided a gas-turbine engine including compressor fan blades according to the above one or other aspect of the present invention.

A compressor fan blade for a gas-turbine engine according to the present invention, will now be described, by way of example, with reference to the accompanying drawings.

DETAILED DESCRIPTION OF THE PREFERRED EMBODIMENT

Figure 1:
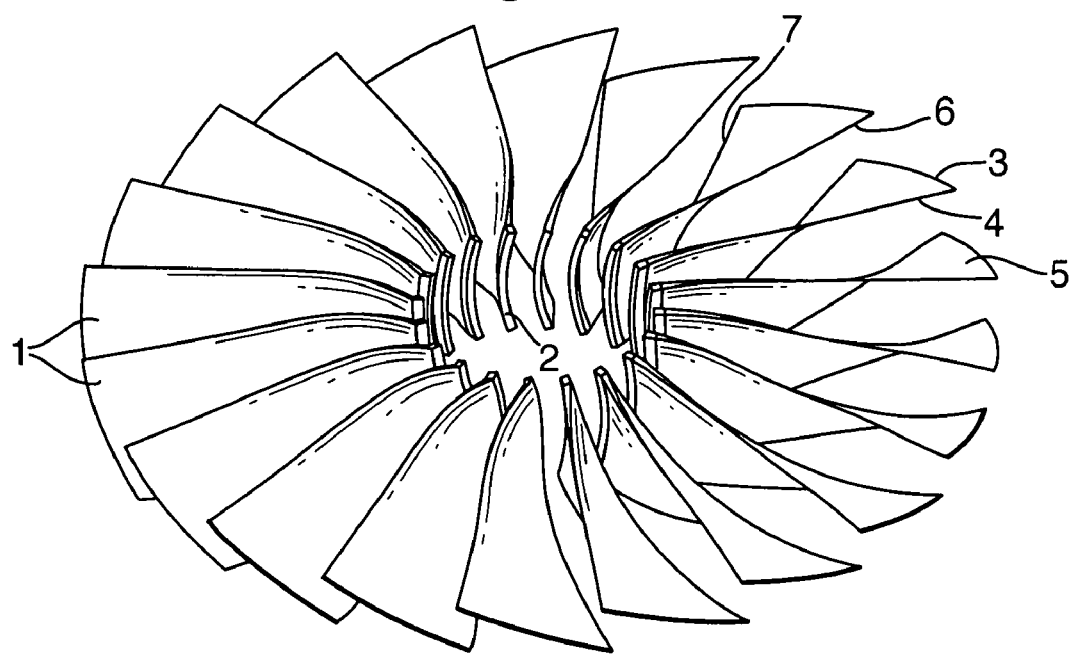
FIG. 1 is a perspective view of conventional compressor blades in an engine at low speed or when stationary.
Figure 2:
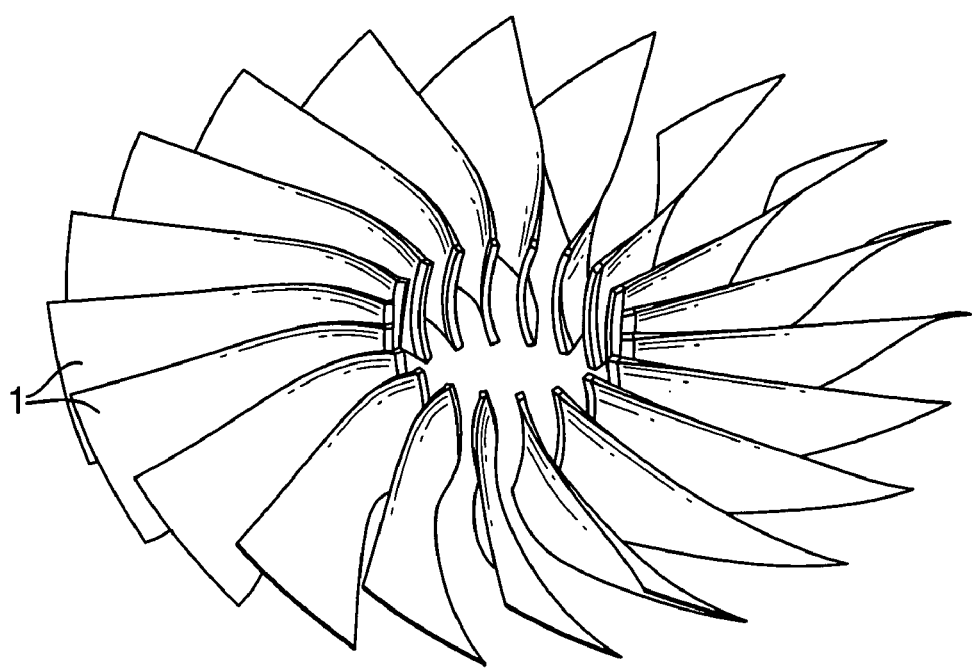
FIG. 2 is a perspective view of the blades at a higher speed.

With reference to FIG. 1, there is shown a part of the compressor stage of a gas-turbine engine having 20 conventional blades 1 fixed at their root 2 to a rotatable hub (not shown) and extending radially outwardly to their free, outer tip 3. The tip 3 rotates close to a surrounding annular ring (not shown). Each blade 1 has a pair of opposed, wide surfaces 4 and 5 separated from one another by a narrow leading edge 6 and an opposite trailing edge 7. The blades 1 are highly twisted along their length, the tip 3 being inclined at an angle of about 60° relative to the root 2 when at rest. As the compressor stage rotates, the blades 1 are subject to centrifugal force exerted along their length. This tends to untwist and extend the blades as can be seen from FIG. 2, which shows the blades at a higher rotation speed.

Figure 3:
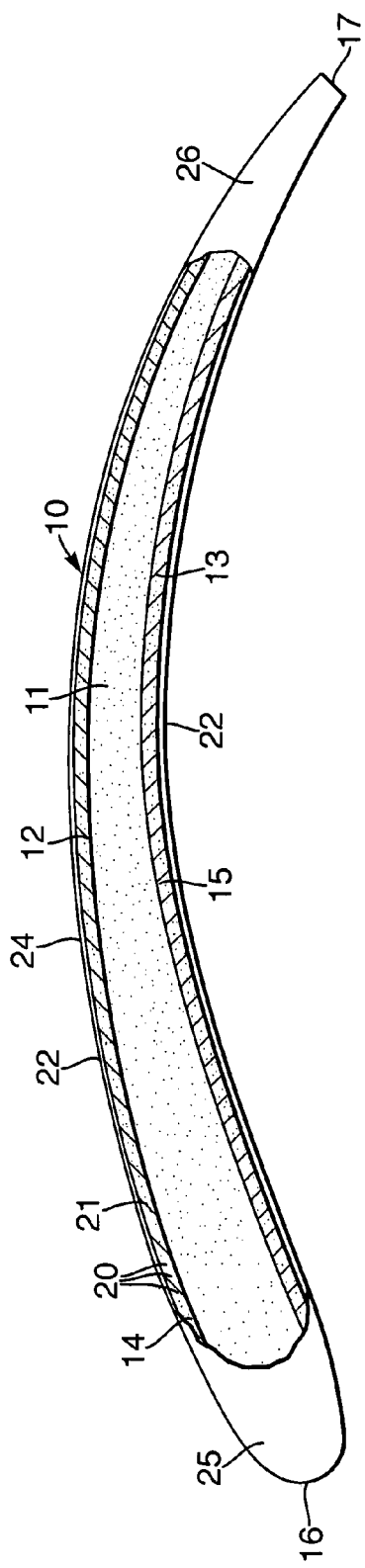
FIG. 3 is a section across the width of a blade according to the present invention.

With reference to FIG. 3, the blades 10 of the present invention are the same shape as the conventional blades 1 and are for use in the compressor stage of a very high bypass gas-turbine engine. The blades 10 are constructed so as to reduce the amount by which they untwist and extend when rotated at speed. FIG. 3 shows a blade 10 according to the present invention, across its width. The blade 1 has a conventional isotropic core 11, which may be formed by layers of carbon fiber material laid on top of one another and bonded into an epoxy matrix. Alternatively, the core could be of a foamed material. On opposed surfaces 12 and 13 of the core 11 there are bonded respective novel outer structural layers 14 and 15. Each structural layer 14 and 15 is formed predominantly of carbon fibers 20 built up in multiple laminated plies of parallel fibers so that the layers have anisotropic properties. The layers 14 and 15 vary in thickness from the leading edge 16, where the blade and the layers are relatively thick, to the trailing edge 17 where the blade and layers are relatively thin. The variation in thickness of the layers 14 and 15 may be achieved by varying the number of plies within the layer at different locations across the width. The fibers 20 are embedded in a high toughness resin 21 such as an epoxy-based resin or other polymer resin. The fibers 20 in the layer 14 on the convex broad surface 22 of the blade 10 are inclined at an angle of 30° to the length of the blade. The fibers in the opposed layer 15 on the concave surface 23 of the blade 10 are also inclined at an angle of 30° to the blade length but these fibers are inclined in the opposite sense from those in the first layer 14, that is, the fibers are inclined with respect to one another at an angle of 60°. The fiber angle of the two layers 14 and 15 need not be +30° and −30° but would typically be between about 25° and 35°. The blade 10 is completed by a thin outer surface layer 24 such as an isotropic woven layer of an aramid or similar tough material resistant to damage by impact. The blade 10 also has a leading edge guard 25 and a trailing edge guard 26 of a metal, such as titanium.

Figure 4:
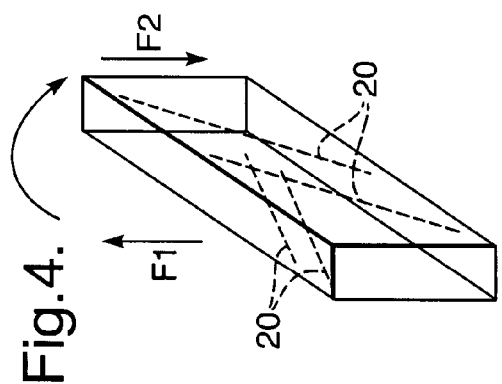
FIG. 4 illustrates schematically forces on the blades.

The arrangement of the anisotropic structural layers 14 and 15 is such as to resist untwisting and extension of the blades 10 when subject to a force directed axially of the blade, such as caused by rotation of the blade. This is because the forces on the two layers 14 and 15 cause the layers to shear in opposite directions, as illustrated by the arrows F1 and F2 in FIG. 4. These forces tend to twist the blade in the opposite direction to the usual extension-twist coupling forces that tends to untwist the blade as a result of its rotation. These opposed shear forces increase the strain energy stored in the blade 10 and increase its stiffness. The opposed shear forces also reduce the length by which the blades extend during use. The increased stiffness of the blades 10 reduces the distortion effect an impact would have on the blade. As a result of this, there is less risk of a blade distorted by impact deforming sufficiently to contact adjacent blades or stationary parts of the turbomachinery. This construction, therefore, makes the engine less prone to catastrophic damage as a result of impact with a foreign object.

Because the blades 10 extend less at high speed than conventional blades, it is easier to maintain a small gap between the blade tips and surrounding components. This may enable the efficiency of turbomachinery to be increased.

Composite blades are usually cured in a mould and will typically come out of the mould with a different twist than when they were put in. Because of the highly twisted nature of these blades, allowance needs to be made to take into account this change of shape so that the finished blades have the desired twist.

It will be appreciated that the composite material used in the blade may have fibers other than of carbon, such as of glass or aramid. Also, different matrix materials may be used. There may be other forms of layer that would have a similar effect to the oppositely inclined fibers in the structural layers mentioned above.

The blades of the present invention are not confined to use in gas-turbine engines but could be used in other turbomachinery, in particular where relatively wide and highly twisted blades are used.

What we claim is:

1. A blade for turbomachinery, said blade having a length, being twisted along its length and comprising:
   a leading edge extending along the length of the blade;
   a trailing edge extending along the length of the blade;
   two opposed broad surfaces extending along the length of the blade and separated from one another by said leading and trailing edges; and
   composite fiber layers adjacent respective ones of said opposed surfaces,
   wherein said composite fiber layers on said opposed surfaces are arranged such that extension forces applied to said blade along its length produce opposing forces in said composite fiber layers resisting untwisting of said blade, and
   wherein said fiber layers vary in thickness from said leading edge to said trailing edge, the layers being thicker towards said leading edge than said trailing edge.

2. A blade according to claim 1, wherein fibers in said composite fiber layers lie at an angle to said blade length of between about 25° and 35° in opposite senses on opposite sides of said blade.

3. A blade according to claim 1, wherein said blade has an outer tip and a root, and wherein said outer tip is inclined at an angle of substantially 60° relative to said root when at rest.

4. A blade according to claim 1, wherein fibers in said composite fiber layers are of a carbon material.

5. A blade according to claim 1, wherein said composite fiber layers include fibers bonded into an epoxy matrix.

6. A blade according to claim 1, wherein said blade has an isotropic core.

7. A blade according to claim 1, including an outer surface layer of an impact-resistant material.

8. Turbomachinery including a plurality of blades according to claim 1.

9. A gas-turbine engine including compressor fan blades according to claim 1.

10. A blade for turbomachinery, said blade having a length, being twisted along its length and comprising:
    a leading edge extending along the length of said blade;
    a trailing edge extending along the length of said blade;
    two opposed broad surfaces extending along the length of said blade and separated from one another by said leading and trailing edges; and
    composite fiber layers adjacent respective ones of said opposed surfaces,
    wherein fibers in said composite fiber layers on opposed surfaces are inclined with respect to one another such that extension forces applied to said blade along its length produce oppositely-directed shear forces in said composite fiber layers resisting untwisting of said blade, and
    wherein said fiber layers vary in thickness from said leading edge to said trailing edge, the layers being thicker towards said leading edge than said trailing edge.

11. A blade according to claim 10, wherein fibers in said composite fiber layers lie at an angle to the blade length of between about 25° and 35° in opposite senses on opposite sides of said blade.

12. Turbomachinery including a plurality of blades arranged for rotation about an axis, said blades each having a length extending radially of said axis, being twisted along its length and comprising:
    a leading edge extending along the length of said blade;
    a trailing edge extending along the length of said blade;
    two opposed broad surfaces extending along the length of said blade and separated from one another by said leading and trailing edges; and
    composite fiber layers adjacent respective ones of said opposed surfaces,
    wherein said composite fiber layers on said opposed surfaces are arranged such that extension forces applied to said blades along their length produce opposing forces in said composite fiber layers resisting untwisting of said blades, and
    wherein said composite fiber layers vary in thickness from said leading edges to said trailing edges, the layers being thicker towards said leading edges than said trailing edges.

13. Turbomachinery according to claim 12, wherein fibers in said composite fiber layers lie at an angle to the blade length of between about 25° and 35° in opposite senses on opposite sides of said blade.

14. A gas-turbine engine including a plurality of compressor fan blades arranged for rotation about an axis, said blades each having a length extending radially of said axis and comprising:
- a leading edge extending along the length of said blade;
- a trailing edge extending along the length of said blade;
- two opposed broad surfaces extending along the length of said blade and separated from one another by said leading and trailing edges; and
- composite fiber layers adjacent respective ones of said opposed surfaces,
- wherein said composite fiber layers on said opposed surfaces are arranged such that extension forces applied to said blades along their length produce opposing forces in said composite fiber layers resisting untwisting of said blades, and
- wherein said composite fiber layers vary in thickness from said leading edges to said trailing edges, the layers being thicker towards said leading edges than said trailing edges.

15. A gas-turbine engine according to claim 14, wherein fibers in said composite fiber layers lie at an angle to the blade length of between about 25° and 35° in opposite senses on opposite sides of said blade.

* * * * *

UNITED STATES PATENT AND TRADEMARK OFFICE
CERTIFICATE OF CORRECTION

| | | |
|---|---|---|
| PATENT NO. | : 7,896,619 B2 | Page 1 of 1 |
| APPLICATION NO. | : 11/802714 | |
| DATED | : March 1, 2011 | |
| INVENTOR(S) | : Hill et al. | |

It is certified that error appears in the above-identified patent and that said Letters Patent is hereby corrected as shown below:

In Column 4, Line 5, in Claim 1, delete "lavers" and insert -- layers --, therefor.

In Column 4, Line 41, in Claim 10, delete "fiber lavers" and insert -- fiber layers --, therefor.

In Column 4, Line 42, in Claim 10, delete "the lavers" and insert -- the layers --, therefor.

Signed and Sealed this
Seventeenth Day of May, 2011

David J. Kappos
*Director of the United States Patent and Trademark Office*